(12) United States Patent
Sinusas et al.

(10) Patent No.: US 11,072,422 B2
(45) Date of Patent: Jul. 27, 2021

(54) COUNTER TORQUE DEVICE

(71) Applicant: Bell Helicopter Textron Inc., Fort Worth, TX (US)

(72) Inventors: Eric Albert Sinusas, Euless, TX (US); Albert Gerard Brand, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 569 days.

(21) Appl. No.: 16/004,375

(22) Filed: Jun. 9, 2018

(65) Prior Publication Data

US 2019/0375498 A1 Dec. 12, 2019

(51) Int. Cl.
*B64C 27/82* (2006.01)
*B64C 5/00* (2006.01)

(52) U.S. Cl.
CPC .............. *B64C 27/82* (2013.01); *B64C 5/00* (2013.01); *B64C 2027/8263* (2013.01)

(58) Field of Classification Search
CPC .. B64C 27/82; B64C 5/00; B64C 5/06; B64C 5/12; B64C 2027/8263; B64C 2027/8236; B64C 2027/8281
See application file for complete search history.

(56) References Cited

U.S. PATENT DOCUMENTS

| | | | | |
|---|---|---|---|---|
| 1,971,734 A * | 8/1934 | Stalker | ..................... | B64C 25/36 416/91 |
| 2,155,409 A * | 4/1939 | La Cierva | ............... | B64C 27/02 244/17.13 |
| 2,959,373 A * | 11/1960 | Zuck | ....................... | B64C 27/30 244/7 C |
| 7,032,860 B1 * | 4/2006 | Kirk | ...................... | B64C 27/006 244/17.15 |
| 8,814,078 B2 * | 8/2014 | Brand | ..................... | B64C 27/82 244/17.21 |
| 8,840,058 B2 * | 9/2014 | Brand | ..................... | B64C 27/82 244/17.19 |
| 2010/0019079 A1 * | 1/2010 | Evulet | ..................... | B64C 27/82 244/17.19 |
| 2017/0349273 A1 * | 12/2017 | Parsons | ................... | B64C 27/82 |
| 2017/0349276 A1 * | 12/2017 | Fenny | .................... | H02K 7/116 |
| 2018/0346135 A1 * | 12/2018 | Haldeman | ................ | H02P 3/04 |

* cited by examiner

*Primary Examiner* — Rodney A Bonnette
(74) *Attorney, Agent, or Firm* — Lightfoot & Alford PLLC

(57) ABSTRACT

Systems and methods include providing an aircraft with a fuselage, a tail boom or empennage extending from the fuselage, a main rotor, a tail rotor, and at least one counter torque device. The counter torque device provides counter torque to the fuselage to prevent rotation of fuselage when the main rotor is operated, particularly in right sideward flight (RSF) for conventional helicopters with a counter-clockwise rotating (when viewed from above the helicopter) main rotor.

17 Claims, 11 Drawing Sheets

COUNTER TORQUE DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

In flight, aircraft are subjected to various aerodynamic forces as a result of the design, flight characteristics, and operating parameters of a particular aircraft. Rotorcraft are particularly sensitive to such aerodynamic forces since rotorcraft have not only forward flight mobility, but also hover, rearward, and lateral capability. To provide yaw control, rotorcraft typically employ either a traditional open tail rotor or a ducted fan at an aft end of an empennage or tail boom of the rotorcraft. However, lateral movement capabilities of rotorcraft are often limited by the amount of thrust produced by the tail rotor or ducted fan. Further, when operating in strong crosswinds, lateral movement capabilities of rotorcraft may be further restricted.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe a spatial orientation of aspects of such components should be understood to describe a relative relationship between the components or a spatial orientation of aspects of such components, respectively, as the device described herein may be oriented in any desired direction.

Figure 1:
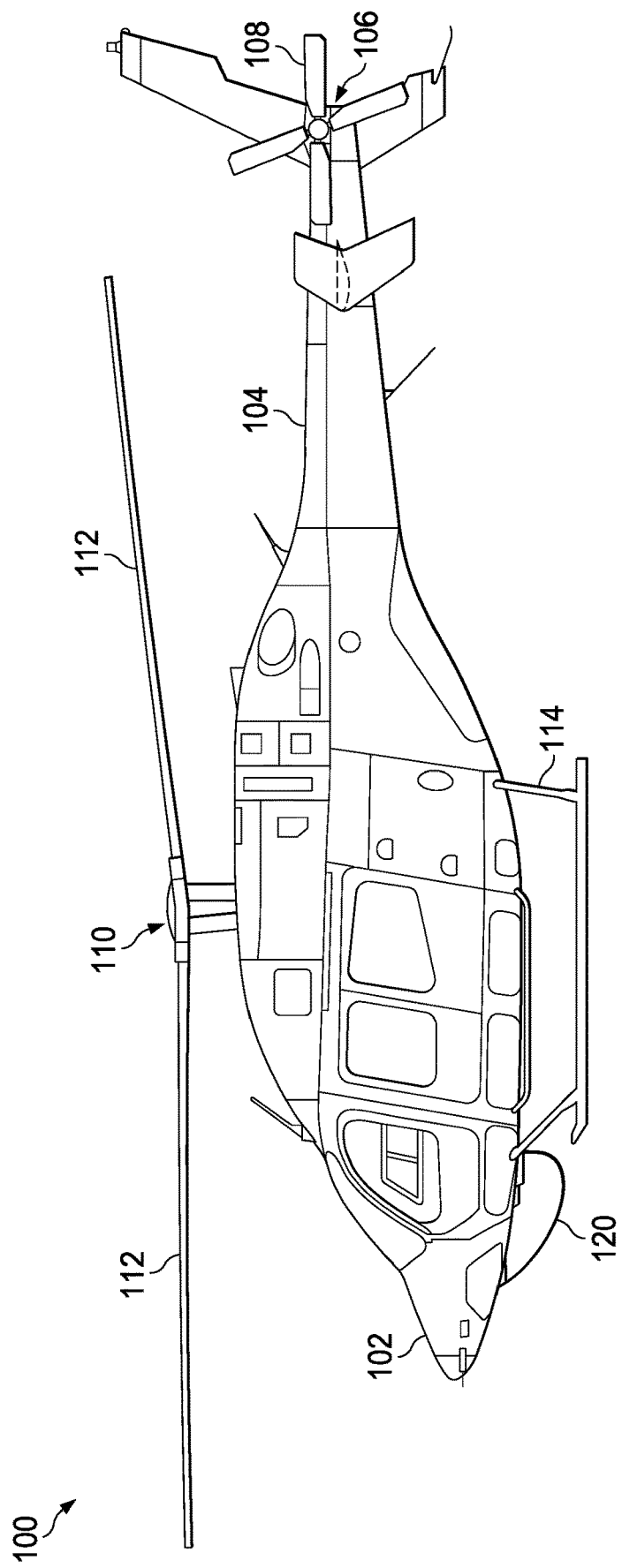
FIG. 1 is a side view of a helicopter according to this disclosure.
Figure 2:
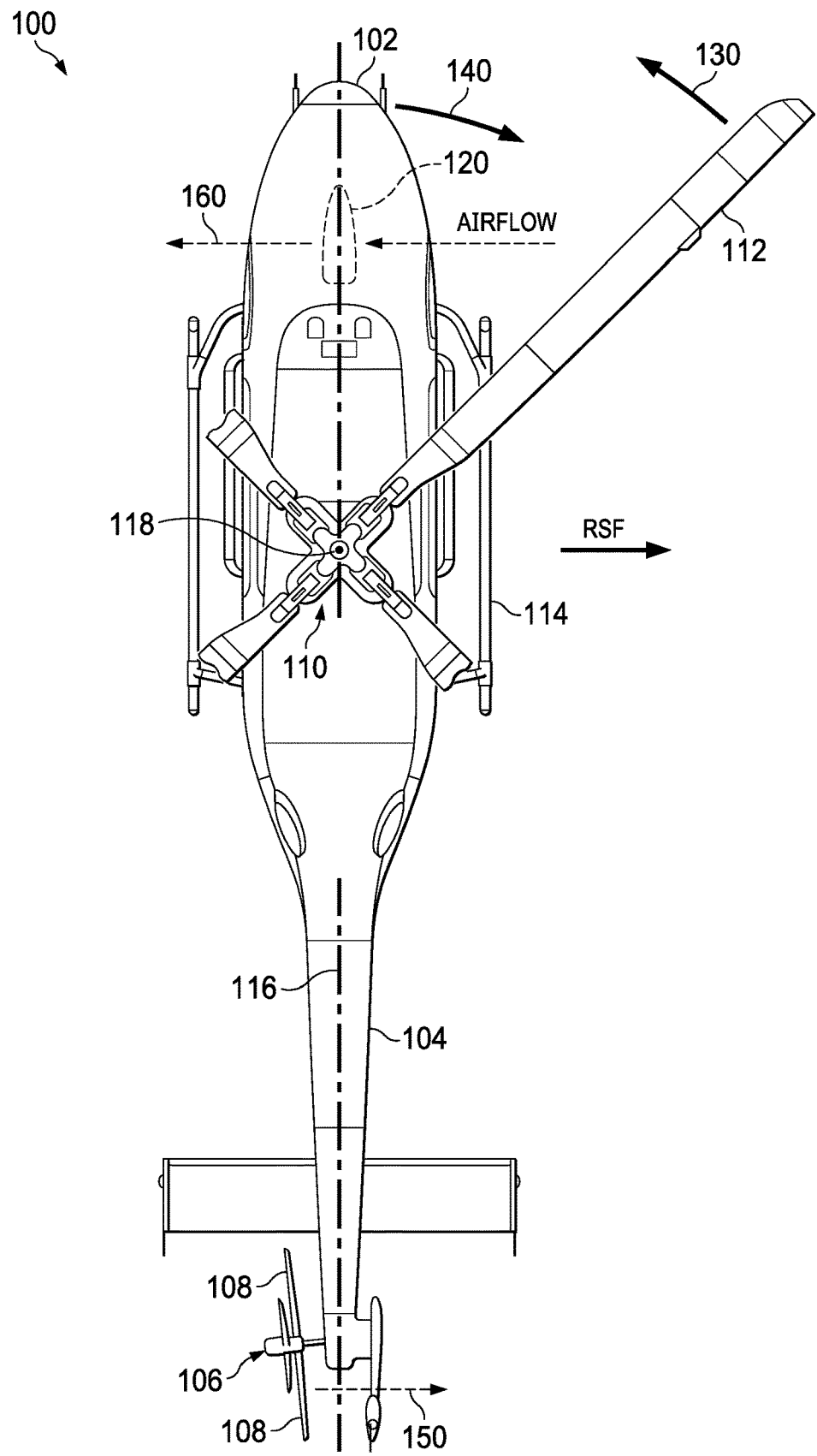
FIG. 2 is a simplified top view of the helicopter of FIG. 1.

Referring to FIGS. 1 and 2, a side view and a simplified top view of a helicopter 100 are shown, respectively. Helicopter 100 comprises a fuselage 102 and an empennage or tail boom 104. Helicopter 100 comprises a tail rotor 106 disposed on an aft end of the tail boom 104. The tail rotor 106 comprises a plurality of tail rotor blades 108 and is selectively rotatable to provide counter torque to the fuselage 102 of helicopter 100 during operation. Helicopter 100 further comprises a main rotor 110 having a plurality of main rotor blades 112 that are selectively rotatable about a rotational axis 118 to provide vertical lift to the helicopter 100. A landing gear or skid 114 is also attached to the fuselage 102 and configured to support the helicopter 100 when the helicopter 100 is on the ground. While not shown, helicopter 100 also comprises a flight control system, which may, for example, include hardware and/or software for controlling the helicopter 100 during operation. Additionally, while not shown, helicopter 100 may also comprise a combustion engine. Furthermore, in the embodiment shown, helicopter 100 comprises a plate 120.

The plate 120 is disposed on a bottom side of the fuselage 102 and protrudes downward from the fuselage 102 into the airflow. Most notably, the plate 120 is aligned with a longitudinal axis 116 of the fuselage 102. The plate 120 is disposed forward of the rotational axis 118 of the main rotor 110 and the center of gravity of the helicopter 100, which may, at least in some embodiments, be coincidental. In the embodiment shown, the plate 120 comprises a symmetrically shaped profile when viewed from the top of the fuselage 102. In particular, the plate 120 comprises a substantially flat surface when viewed from the top of the fuselage 102. The plate 120 is fixed with respect to the fuselage 102. However, in other embodiments, the plate 120 may be selectively rotatable against or retractable into the fuselage 102. Selective deployment and retraction of plate 120 may be controlled by a pilot or a flight control system of helicopter 100.

In operation, the main rotor 110 rotates about its rotational axis 118 in a counter-clockwise direction as viewed from above and as shown by arrow 130. Exerting this rotation imparts on the fuselage 102 a propensity to rotate in the opposing, clockwise direction as shown by arrow 140. The tail rotor 106 provides thrust in a lateral, rightward direction, which produces a counter torque about rotational axis 118 of the main rotor 110 in the counter-clockwise direction shown by arrow 150. This effectively prevents rotation of the fuselage 102 during rotation of the main rotor 110. Further, by placing the tail rotor 106 at the end of the tail boom 104, this maximizes the moment arm from the rotational axis 118 of the main rotor 110 and reduces the power demand of the tail rotor 106 to provide the requisite counter torque to the fuselage 102.

During right sideward flight (RSF) or equivalent crosswind conditions, additional power is typically required from the tail rotor 106 to maintain the heading of the fuselage 102 as viewed from above. The increased power is due, at least in part, to the "weathervane" effect of vertical stabilizers disposed on the end of the tail boom 104. Accordingly, the plate 120, by virtue of its drag in sideward flight, is configured to provide additional counter torque to supplement the tail rotor 106 and prevent counter rotation of the fuselage 102 during RSF. As the helicopter 100 moves laterally in RSF, airflow contacts the right side of the plate 120, applying a leftward drag force on the plate 120. The drag force applied by the airflow on the plate 120 produces counter torque about rotational axis 118 of the main rotor 110 in the counter-clockwise direction shown by arrow 160. As such, the plate 120 may provide sufficient counter torque that reduces the power demand of the tail rotor 106 to provide heading control to the helicopter 100 during RSF.

Figure 3:
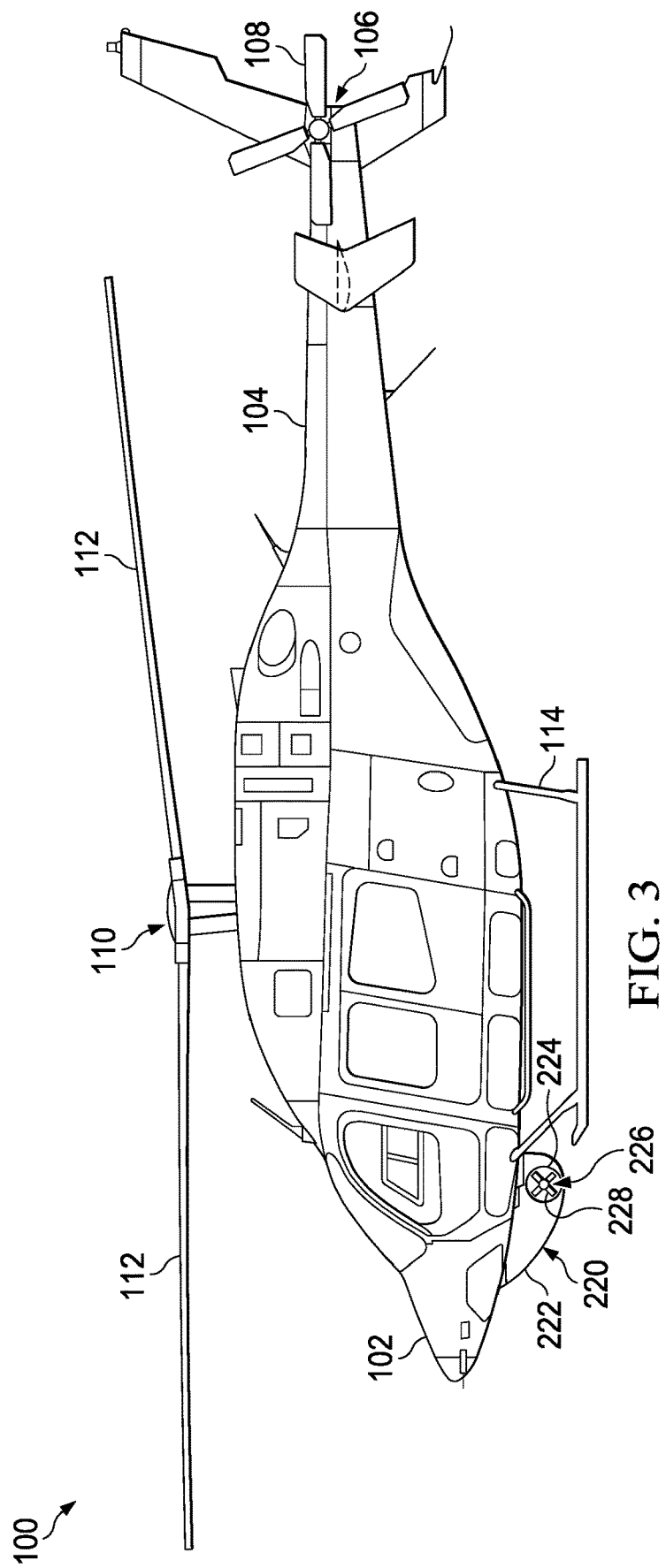
FIG. 3 is a side view of another embodiment of a helicopter according to this disclosure.
Figure 4:
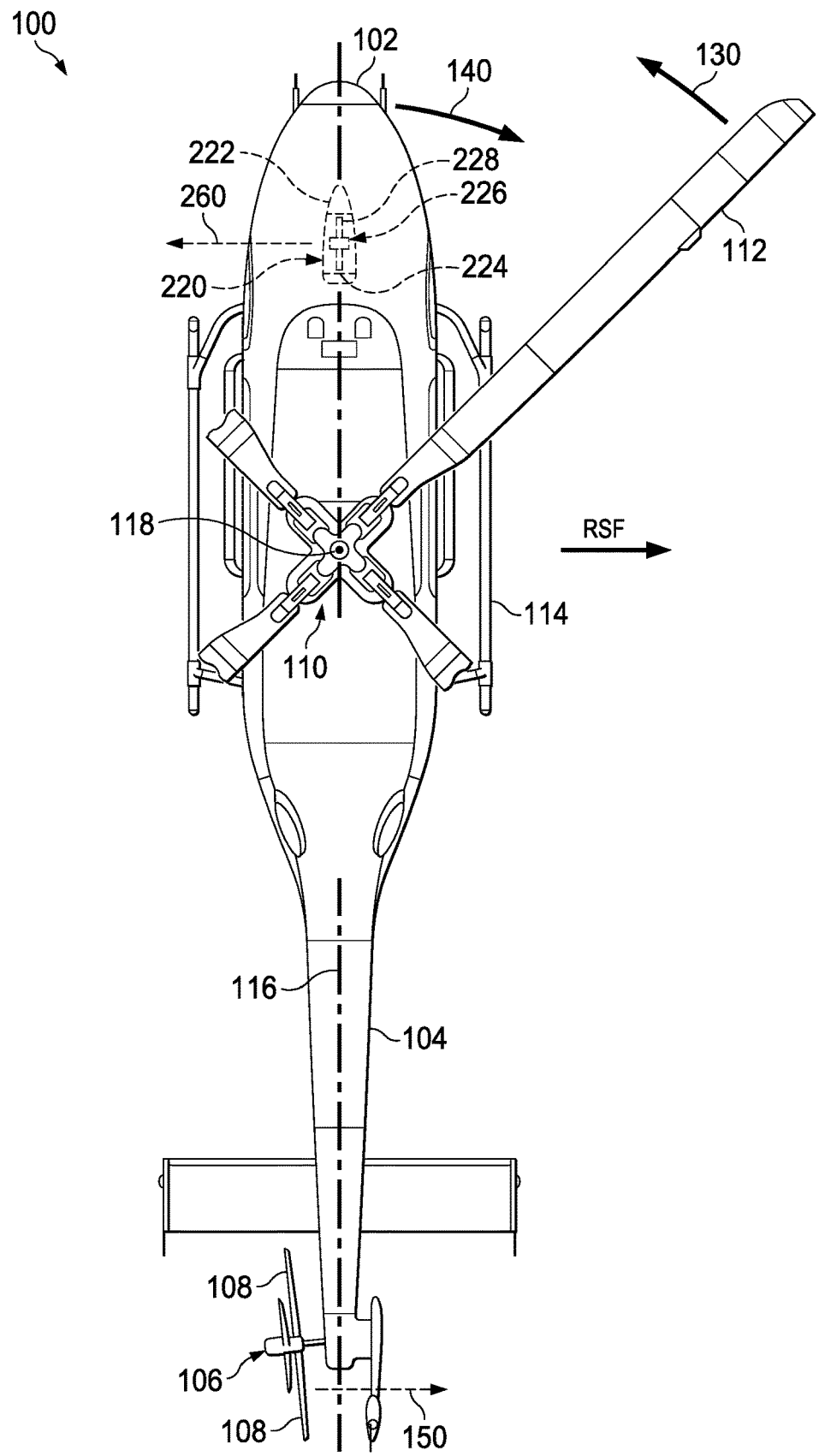
FIG. 4 is a simplified top view of the helicopter of FIG. 3.

Referring to FIGS. 3 and 4, a side view and a simplified top view of another embodiment of helicopter 100 are shown, respectively. However, in the embodiment shown, helicopter 100 comprises thrust fan 220. Thrust fan 220 comprises a housing 222, an aperture or duct 224 disposed through the housing 222, and a thrust rotor 226 comprising a plurality of thrusting rotor blades 228 and disposed within the duct 224. Similar to plate 120, thrust fan 220 is disposed on a bottom side of the fuselage 102, is aligned with the longitudinal axis 116 of the fuselage 102, and is disposed forward of the rotational axis 118 of the main rotor 110 and the center of gravity of the helicopter 100. The housing 222 may comprise a symmetrically shaped profile when viewed from the top of the fuselage 102. Additionally, in some embodiments, the housing 222 may be fixed with respect to the fuselage 102 or may be selectively rotatable against or retractable into the fuselage 102.

In operation, the thrust fan 220 is generally configured to provide counter torque to prevent rotation of the fuselage 102 during RSF, and when placed ahead of the center of gravity, the thrust rotor 226 rotates within the duct 224 to provide thrust in a leftward direction, which produces counter-clockwise torque about rotational axis 118 of the main rotor 110 as shown by arrow 260. As such, it will be appreciated that the thrust fan 220 operates as a ducted fan to provide counter torque to the fuselage 102. The thrust fan 220 may generally provide sufficient counter torque that reduces the power demand of the tail rotor 106 to provide directional control of the helicopter 100 during RSF. As opposed to the passive operation of plate 120, thrust fan 220 operates in an active manner to supplement the counter torque produced by the tail rotor 106 during RSF. Accordingly, it will be appreciated that the rotational speed and/or generated thrust of thrust fan 220 may be actively controlled by a pilot or a flight control system of helicopter 100.

Figure 5:
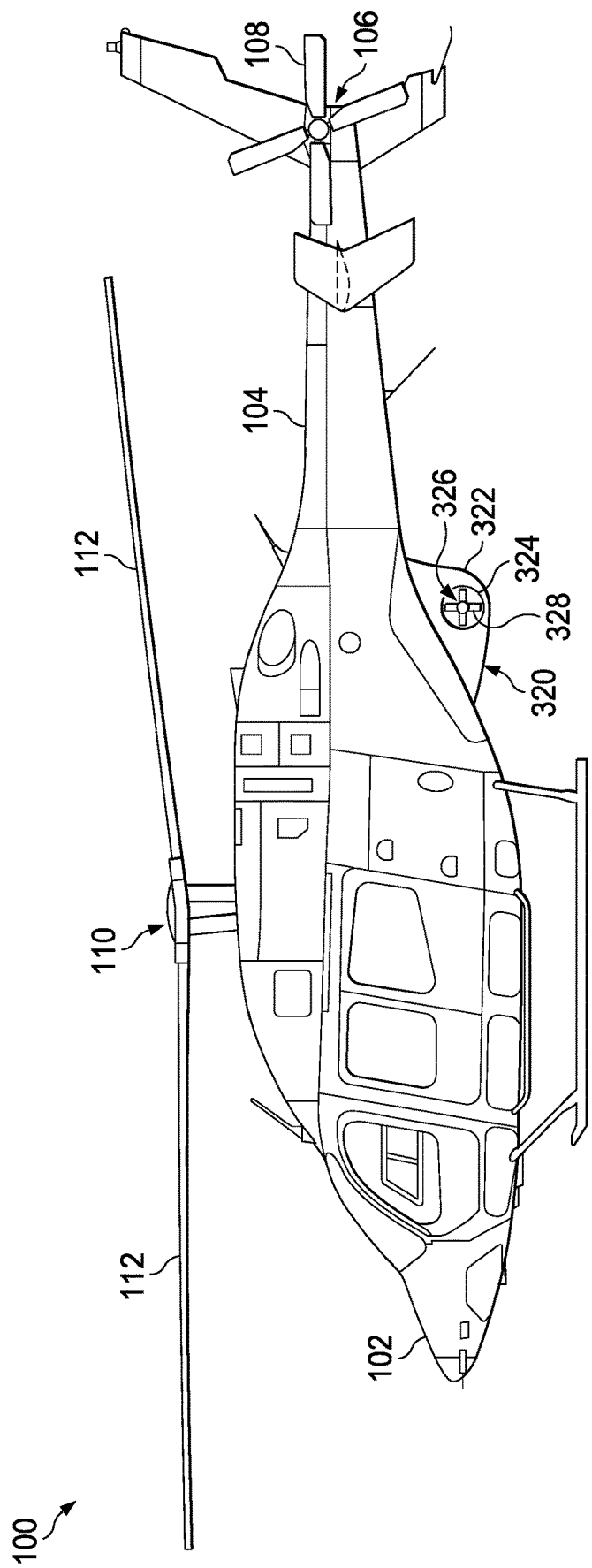
FIG. 5 is a side view of yet another embodiment of a helicopter according to this disclosure.
Figure 6:
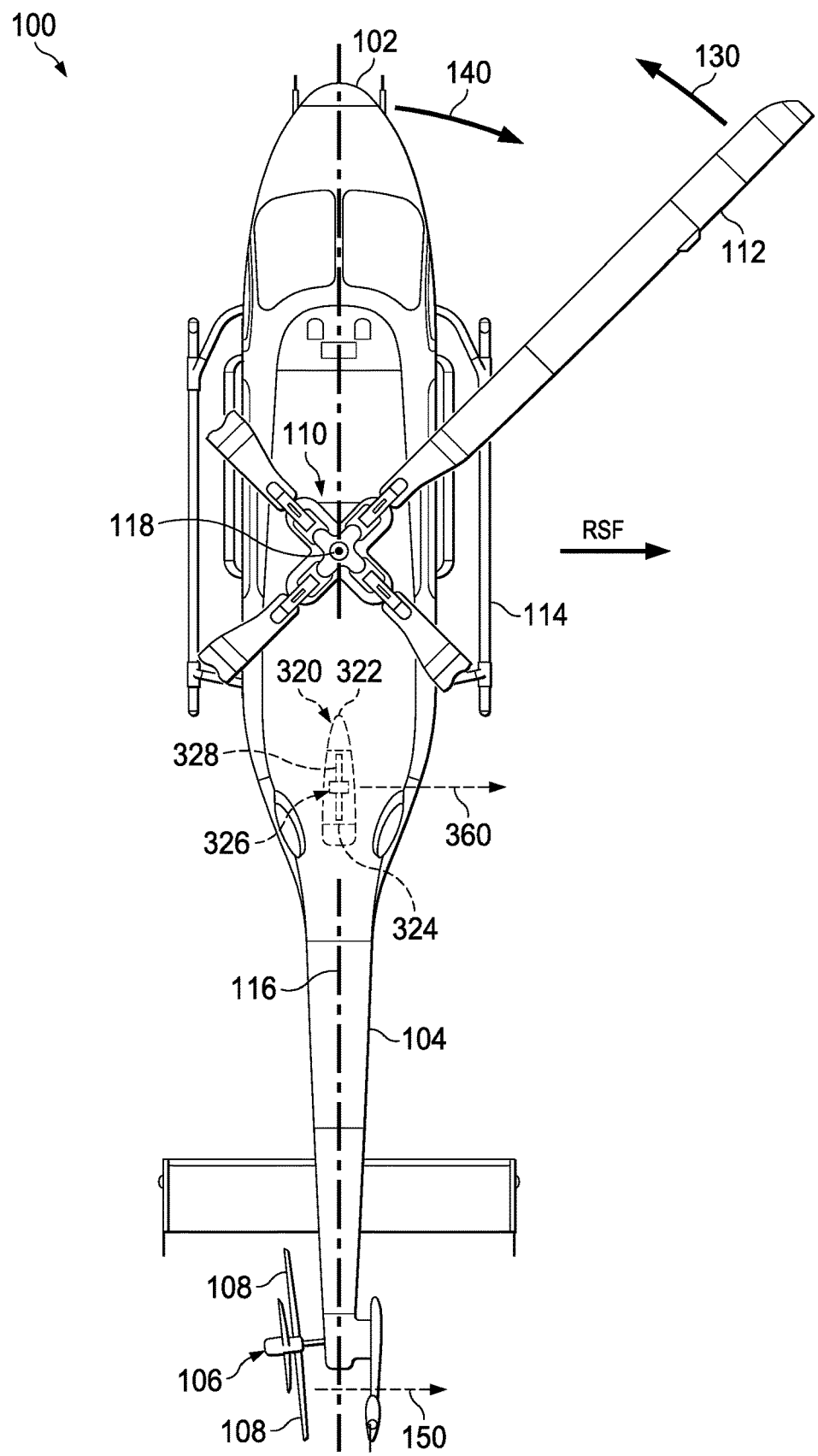
FIG. 6 is a simplified top view of the helicopter of FIG. 5.

Referring to FIGS. 5 and 6, a side view and a simplified top view of another embodiment of helicopter 100 are shown, respectively. In the embodiment shown, helicopter 100 comprises thrust fan 320. Thrust fan 320 comprises a housing 322, an aperture or duct 324 disposed through the housing 322, and a thrust rotor 326 comprising a plurality of thrusting rotor blades 328 and disposed within the duct 324. Similar to thrust fan 220, thrust fan 320 is disposed on a bottom side of the fuselage 102 and is aligned with the longitudinal axis 116 of the fuselage 102. In some embodiments, thrust fan 320 may be disposed on a top side of the fuselage 102. However, as opposed to thrust fan 220, thrust fan 320 is disposed rearward of the rotational axis 118 of the main rotor 110 and the center of gravity of the helicopter 100. As such, thrust fan 320 provides thrust in the same direction as the tail rotor 106 as compared to thrust fan 220. The housing 322 may comprise a symmetrically shaped profile when viewed from the top of the fuselage 102. Additionally, in some embodiments, the housing 322 may be fixed with respect to the fuselage 102 or may be selectively retractable into and deployable from the fuselage 102.

In operation, thrust fan 320 is generally configured to provide counter torque to prevent rotation of the fuselage 102 during hover and RSF. Accordingly, the thrust rotor 326 rotates within the duct 324 to provide thrust in a lateral, rightward direction, which produces counter torque about rotational axis 118 of the main rotor 110 in the counter-clockwise direction shown by arrow 360. As such, it will be appreciated that the thrust fan 320 operates as a ducted fan to provide counter torque to the fuselage 102. The thrust fan 320 may generally provide sufficient counter torque that reduces the power demand of the tail rotor 106 to provide stability to the helicopter 100 during RSF. Additionally, since the thrust fan 320 is disposed on rearward-facing portion of the fuselage 102, thrust fan 320 may provide less drag than plate 120 and/or thrust fan 220. Furthermore, since thrust fan 320 is disposed rearward of the rotational axis 118 of the main rotor 110 and the center of gravity of the helicopter 100, thrust fan 320 may also provide stabilization to helicopter 100 during forward flight. Furthermore, it will be appreciated that the rotational speed and/or generated thrust of thrust fan 320 may be actively controlled by a pilot or a flight control system of helicopter 100.

Figure 7:
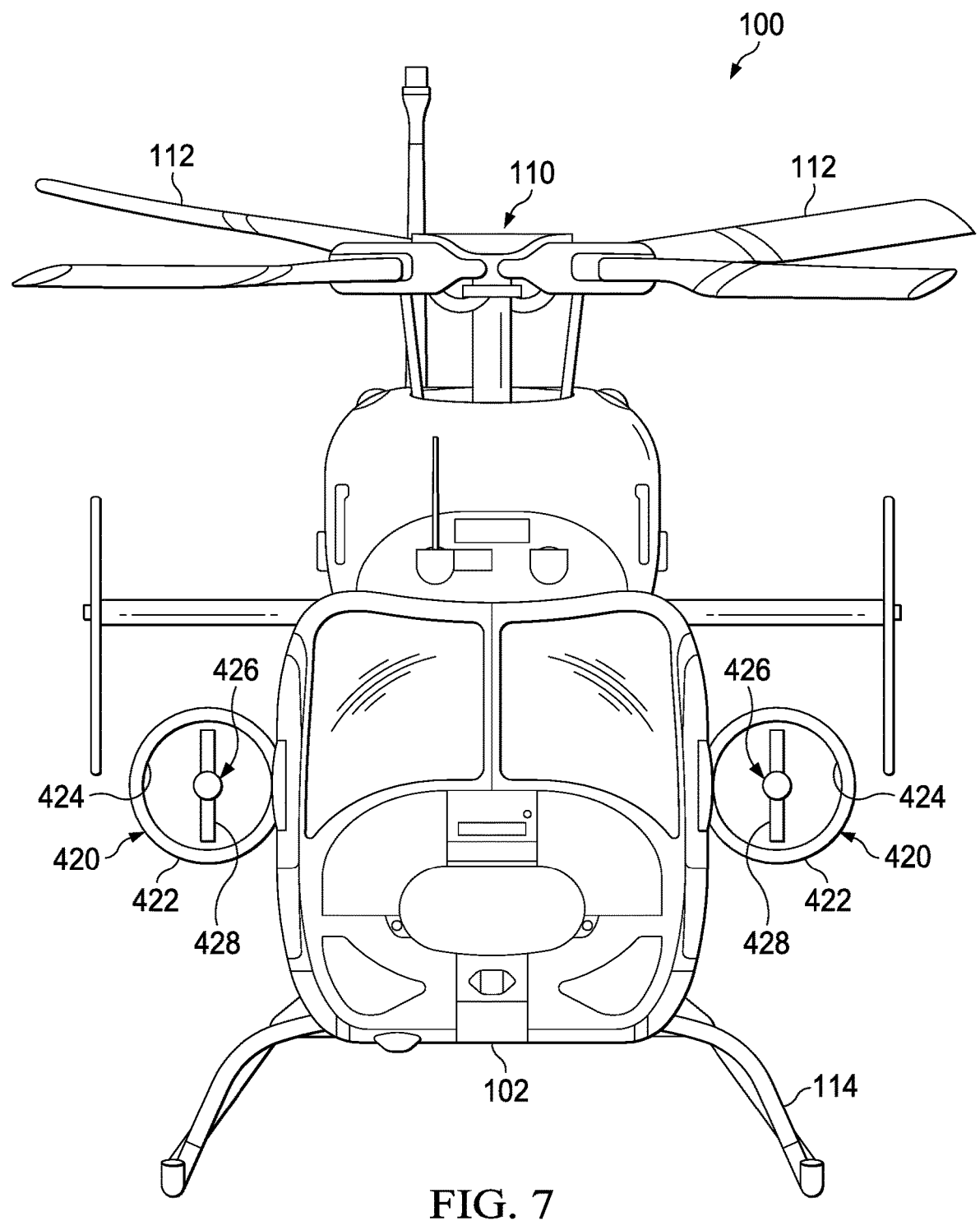
FIG. 7 is a front view of a helicopter according to this disclosure.
Figure 8:
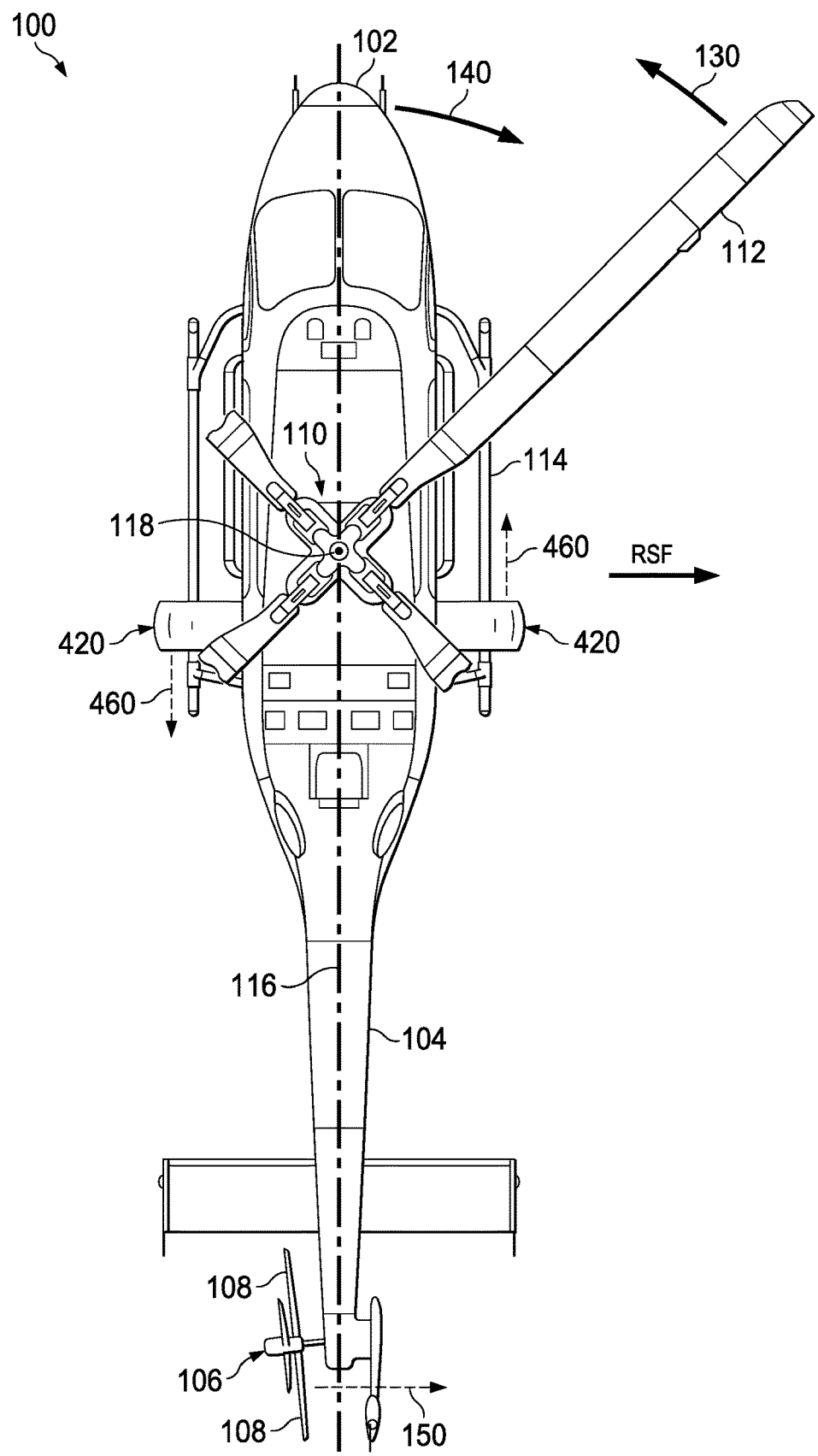
FIG. 8 is a simplified top view of the helicopter of FIG. 7.

Referring to FIGS. 7 and 8, a front view and a simplified top view of another embodiment of helicopter 100 are shown, respectively. In the embodiment shown, helicopter 100 comprises thrust fans 420 disposed on opposing sides of the fuselage 102. Each thrust fan 420 comprises a housing 422, an aperture or duct 424 disposed through the housing 422, and a thrust rotor 426 comprising a plurality of thrusting rotor blades 428 and disposed within the duct 424. In the embodiment shown, the thrust fans 420 are disposed longitudinally rearward of the rotational axis 118 of the main rotor 110 and the center of gravity of the helicopter 100 which may, at least in some embodiments, be coincidental. By placing the thrust fans 420 rearward of the rotational axis 118 of the main rotor 110 and the center of gravity of the helicopter 100, thrust fan 420 may provide directional control and forward thrust for the helicopter 100 during forward flight. Additionally, in some embodiments, the thrust fans 420 may be pivotable with respect to the fuselage 102 and/or selectively retractable into and deployable from the fuselage 102.

In operation, thrust fans 420 are generally configured to provide counter torque to prevent counter rotation of the fuselage 102 during RSF. Accordingly, the thrust rotor 426 of each thrust fan 420 may be selectively rotated within its respective duct 424 to provide thrust in opposing directions. In the embodiment shown, the left thrust fan 420 provides thrust in a forward direction, and the right thrust fan 420 provides thrust in a backward direction, which collectively produces counter torque about rotational axis 118 of the main rotor 110 in the counter-clockwise direction shown by arrows 460. As such, it will be appreciated that the thrust fans 420 operate as ducted fans to provide counter torque to the fuselage 102. The thrust fans 420 may generally provide sufficient counter torque that reduces the power demand of the tail rotor 106 to provide directional control to the helicopter 100 during RSF and equivalent crosswind conditions. Since the thrust fans 420 operate in an active manner to supplement the counter torque produced by the tail rotor 106 during RSF, it will be appreciated that the rotational direction, rotational speed, and/or generated thrust of thrust fans 420 may be actively controlled by a pilot or a flight control system of helicopter 100.

Figure 9:
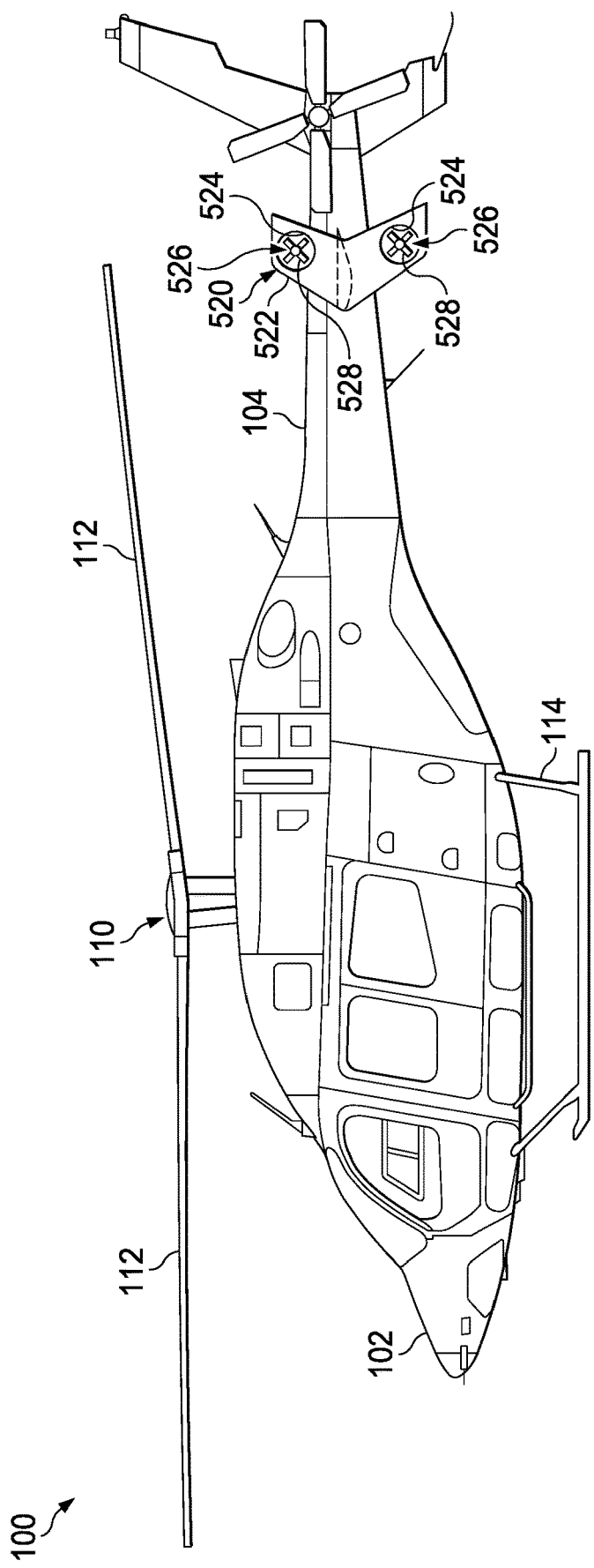
FIG. 9 is a side view of an alternative embodiment of a helicopter according to this disclosure.
Figure 10:
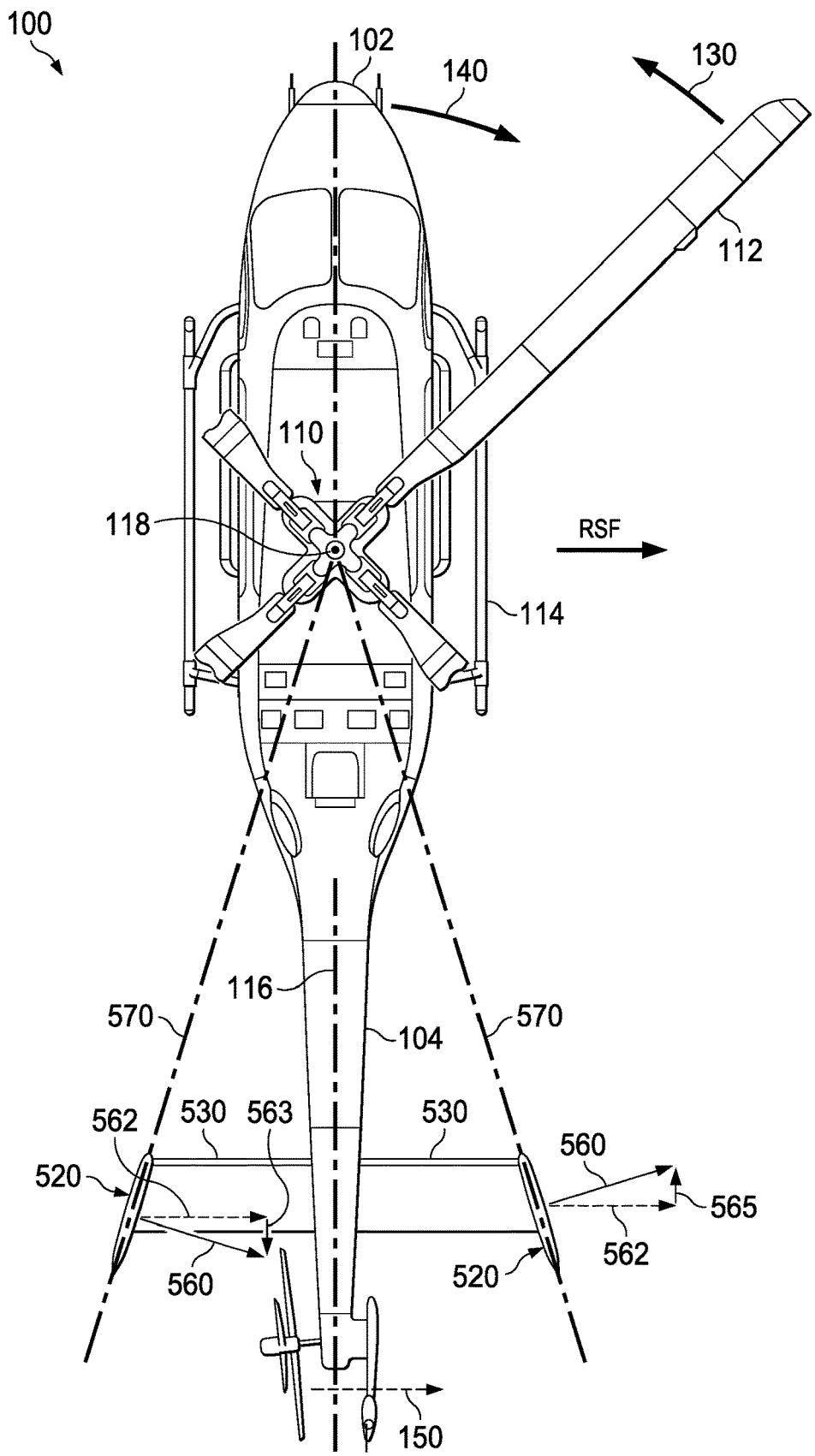
FIG. 10 is a simplified top view of the helicopter of FIG. 9.

Referring to FIGS. 9 and 10, a side view and a simplified top view of an alternative embodiment of helicopter 100 are shown, respectively. In the embodiment shown, helicopter 100 comprises thrust fans 520 disposed on opposing sides of the tail boom 104 and symmetrical about longitudinal axis 116 of helicopter 100. Each thrust fan 520 comprises a housing 522, at least one aperture or duct 524 disposed through the housing 522, at least one thrust rotor 526 comprising a plurality of thrusting rotor blades 528 and disposed within the duct 524, and a horizontal stabilizer 530. In the embodiment shown, each thrust fan 520 comprises top and bottom ducts 524 and an associated thrust rotor 526 disposed within each duct 524. Additionally, in the embodiment shown, housings 522 are vertical stabilizers that are offset laterally from the longitudinal axis 116 of helicopter 100 and coupled to the tail boom 104 of helicopter 100 by the horizontal stabilizer 530. However, in other embodiments, housing 522 may comprise a tail fin or other stabilizer mounted to the tail boom 104. In this embodiment, each thrust fan 520 and housing 522 is radially aligned with the rotational axis 118 of the main rotor 110 as shown by radial lines 570. However, in other embodiments, each thrust fan 520 and housing 522 may be aligned substantially parallel to the longitudinal axis 116, and each thrust rotor 526 may be selectively pivotable to align radially with the rotational axis 118 of the main rotor 110.

In operation, thrust fans 520 are generally configured to provide counter torque to prevent rotation of the fuselage 102 during RSF or equivalent crosswind conditions. By radially aligning each thrust fan 520 and housing 522 with the rotational axis 118 of the main rotor 110, the thrust produced by the thrust fans 520 is orthogonal to radial lines 570, thereby maximizing the counter torque about rotational axis 118 of the main rotor 110 in the counter-clockwise direction shown by arrows 560. Due to the radial alignment with the rotational axis 118 of the main rotor 110, left thrust fan 520 produces counter torque (shown by arrows 560) having a counter torque component 562 and a rearward drag component 563, while right thrust fan 520 produces counter torque (shown by 560) having a counter torque component 562 and a forward thrust component 565. Thus, in some embodiments, only the left thrust fan 520 may be operated to impart rearward drag to the helicopter 100, and only the right thrust fan 520 may be operated to impart additional forward thrust to the helicopter 100. Further, in alternative embodiments, helicopter 100 may only comprise the right thrust fan 520.

However, when both thrust fans 520 are operated, the rearward drag component 563 and forward thrust component 565 may collectively offset, providing negligible effect on the forward-rearward flight of the helicopter 100. It will be appreciated that the thrust fans 520 operate as ducted fans to provide counter torque to the fuselage 102. The thrust fans 520 may generally provide sufficient counter torque that reduces the power demand of the tail rotor 106 to provide directional control to the helicopter 100 during RSF. Since the thrust fans 520 operate in an active manner to supplement the counter torque produced by the tail rotor 106 during RSF, it will be appreciated that the rotational direction, rotational speed, orientation, and/or generated thrust of thrust fans 520 may be actively controlled by a pilot or a flight control system of helicopter 100.

While the embodiments shown depict helicopter 100, it will be appreciated that plate 120 and/or thrust fans 220, 320, 420, 520 may be used in any other aircraft and/or rotorcraft requiring anti-torque to the fuselage 102 during right sideward flight and/or other lateral maneuvers. This is applicable to both "manned" and "un-manned" aircraft. Additionally, an aircraft and/or rotorcraft may include one or more plates 120 and/or thrust fans 220, 320, 420, 520. Furthermore, it will be appreciated that plate 120 and/or thrust fans 220, 320, 420, 520 may be retrofit with existing aircraft and/or rotorcraft. Still further, depending on the rotational direction of the main rotor 110, plate 120 and/or thrust fans 220, 320, 420, 520 may be configured to provide thrust in any direction to counter the torque produced by the main rotor 110 and/or to provide counter torque, or propulsive force, to the fuselage 102 of other aircraft and/or rotorcraft. For example, in embodiments where main rotor 110 rotates in a clockwise direction, plate 120 and/or thrust fans 220, 320, 420, 520 may be configured to provide thrust to prevent rotation of the fuselage 102 during left sideward flight (LSF) or equivalent crosswind conditions.

Furthermore, plate 120 and/or thrust fans 220, 320, 420, 520 may provide sufficient counter torque that reduces the power demand of the tail rotor 106 to provide directional control to the helicopter 100 during RSF. In some embodiments, plate 120 and/or thrust fans 220, 320, 420, 520 may produce sufficient thrust to provide counter torque to the fuselage 102 during RSF, allowing a smaller tail rotor 106 or altogether eliminating the need for a tail rotor 106. Additionally, plate 120 and/or the thrust fans 220, 320, 420, 520 also enable higher RSF speeds and further enable RSF when crosswind speeds traditionally caused unstable RSF. For example, the thrust fan 220 may enable an RSF speed of 35 knots and/or enable RSF when crosswind speeds are at or above 35 knots. Plate 120 operates in a passive manner to supplement the counter torque produced by the tail rotor 106 during RSF, while thrust fans 220, 320, 420, 520 operate in an active manner to supplement the counter torque produced by the tail rotor 106 during RSF. However, each of the plate 120 and/or the thrust fans 220, 320, 420, 520 may be referred to as counter torque devices.

Figure 11:
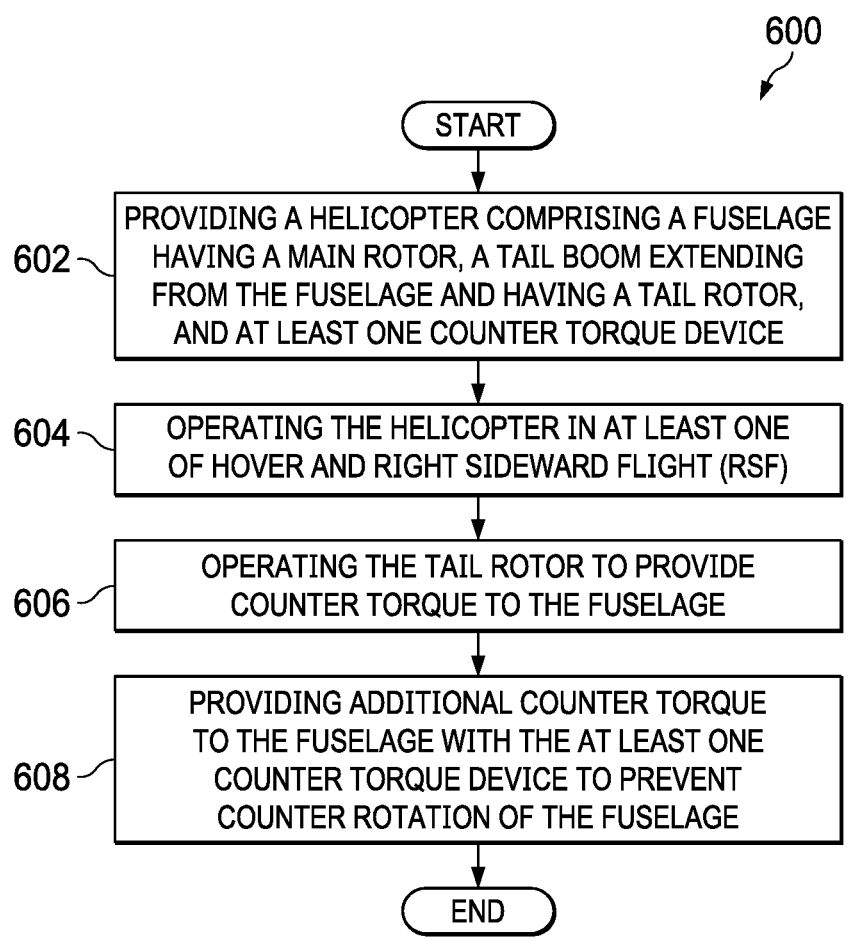
FIG. 11 is a flowchart of a method of operating a helicopter according to this disclosure.

Referring to FIG. 11, a flowchart of a method 600 of operating a helicopter 100 is shown. Method 600 begins at block 602 by providing a helicopter 100 with a fuselage 102, a main rotor 110, a tail rotor 106, and at least one counter torque device 120, 220, 320, 420, 520. Method 600 continues at block 604 by operating the helicopter 100 in at least one of hover and right sideward flight (RSF). Method 600 continues at block 606 by operating the tail rotor 106 to provide counter torque to the fuselage 102. Method 600 concludes at block 608 by providing additional counter torque to the fuselage 102 with the at least one counter torque device 120, 220, 320, 420, 520 to prevent counter rotation of the fuselage 102.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A helicopter, comprising:
   a fuselage comprising a main rotor;
   a tail boom extending from the fuselage and comprising a tail rotor; and
   at least one counter torque device configured to provide counter torque to the fuselage to prevent rotation of fuselage when the main rotor is operated;
   wherein the at least one counter torque device comprises a plate disposed on a bottom side of the fuselage; and
   wherein the at least one counter torque device is selectively retractable into and deployable from the fuselage.

2. The helicopter of claim 1, wherein the at least one counter torque device comprises a thrust fan disposed on opposing sides of the fuselage and configured to produce thrust in opposing directions.

3. The helicopter of claim 1, wherein the at least one counter torque device comprises thrust fans disposed on opposing sides of the tail boom, each thrust fan being coupled to the tail boom by a horizontal stabilizer.

4. The helicopter of claim 3, wherein each thrust fan comprises a housing having at least one duct disposed therethrough, and an associated thrust rotor disposed within the duct.

5. The helicopter of claim 4, wherein the housings comprise vertical stabilizers that are offset laterally from a longitudinal axis of the fuselage and coupled to the tail boom by a horizontal stabilizer.

6. The helicopter of claim 5, wherein the housings are radially aligned with the rotational axis of the main rotor.

7. The helicopter of claim 5, wherein the housings are aligned parallel to the longitudinal axis of the fuselage, and wherein each thrust rotor is selectively pivotable to align radially with the rotational axis of the main rotor.

8. The helicopter of claim 1, wherein at least one thrust device is configured to prevent rotation of the fuselage during sideward flight or equivalent crosswind conditions.

9. The helicopter of claim 8, wherein the at least one thrust device provides sufficient counter torque to reduce the power demand of the tail rotor during sideward flight or equivalent crosswind conditions.

10. A helicopter, comprising:
    a fuselage comprising a main rotor;
    a tail boom extending from the fuselage and comprising a tail rotor; and
    at least one counter torque device configured to provide counter torque to the fuselage to prevent rotation of fuselage when the main rotor is operated;
    wherein the at least one counter torque device comprises a thrust fan disposed on a bottom side of the fuselage.

11. The helicopter of claim 10, wherein the at least one counter torque device is aligned with a longitudinal axis of the fuselage and disposed forward of a rotational axis of the main rotor.

12. The helicopter of claim 10, wherein the at least one counter torque device is aligned with a longitudinal axis of the fuselage and disposed rearward of a rotational axis of the main rotor.

13. A method of operating a helicopter, comprising:
    providing a helicopter comprising a fuselage having a main rotor, a tail boom extending from the fuselage and having a tail rotor, and at least one counter torque device;
    operating the helicopter in at least one of hover and sideward flight;
    operating the tail rotor to provide counter torque to the fuselage; and
    providing additional counter torque to the fuselage with the at least one counter torque device to prevent counter rotation of the fuselage;
    wherein the at least one counter torque device comprises at least one of a plate and a thrust fan disposed on a bottom side of the fuselage.

14. The method of claim 13, further comprising: selectively deploying and retracting the at least one counter torque device.

15. The method of claim 13, wherein the at least one counter torque device comprises thrust fans disposed on opposing sides of the tail boom, wherein each thrust fan comprises a housing having at least one duct disposed therethrough, and an associated thrust rotor disposed within the duct, and wherein the thrust fans are configured to provide propulsive force in forward flight.

16. The method of claim 15, wherein the thrust fans are radially aligned with the rotational axis of the main rotor.

17. The method of claim 15, further comprising: selectively pivoting the thrust fans to radially align the thrust fans with the rotational axis of the main rotor.

* * * * *